United States Patent
Peng et al.

(10) Patent No.: US 12,483,340 B2
(45) Date of Patent: Nov. 25, 2025

(54) RADIO FREQUENCY TRANSCEIVER ADJUSTING METHOD AND ADJUSTING SYSTEM THEREOF

(71) Applicant: Wistron NeWeb Corporation, Hsinchu (TW)

(72) Inventors: Chen-Shu Peng, Hsinchu (TW); Yung-Jinn Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 86 days.

(21) Appl. No.: 18/623,110

(22) Filed: Apr. 1, 2024

(65) Prior Publication Data

US 2024/0413912 A1 Dec. 12, 2024

(30) Foreign Application Priority Data

Jun. 7, 2023 (TW) .................................. 112121259

(51) Int. Cl.
*H04B 17/00* (2015.01)
*H04B 1/38* (2015.01)
*H04B 1/72* (2006.01)

(52) U.S. Cl.
CPC .......... *H04B 17/0087* (2013.01); *H04B 1/38* (2013.01); *H04B 1/72* (2013.01)

(58) Field of Classification Search
CPC ......... H04B 1/38; H04B 17/0087; H04B 1/72
See application file for complete search history.

(56) References Cited

U.S. PATENT DOCUMENTS

| 8,526,939 | B2* | 9/2013 | Harteneck | H04B 17/0087 455/115.2 |
| 11,644,536 | B2* | 5/2023 | Salvesen | G01S 7/4052 342/174 |
| 12,389,243 | B2* | 8/2025 | Wu | H04W 24/06 |
| 2024/0405902 | A1* | 12/2024 | Kobayashi | H04B 17/3912 |

* cited by examiner

*Primary Examiner* — Dac V Ha
(74) *Attorney, Agent, or Firm* — McClure, Qualey & Rodack, LLP

(57) ABSTRACT

A radio frequency transceiver adjusting method includes configuring a controller to execute a circuit matching software module to perform a first transmission test on a radio frequency transceiver to generate a plurality of circuit test results, select a target simulated circuit from a plurality of reference simulated circuits, match the target simulated circuit to the radio frequency transceiver, execute a filter setting software module to set a filter parameter group, convert the filter parameter group into an initial configuration data, import the initial configuration data to the radio frequency transceiver, execute a configuration adjusting software module to perform a second transmission test on the radio frequency transceiver to generate a plurality of parameter test results, select a target parameter from a plurality of reference parameters, and adjust the initial configuration data according to the target parameter.

18 Claims, 7 Drawing Sheets

RADIO FREQUENCY TRANSCEIVER ADJUSTING METHOD AND ADJUSTING SYSTEM THEREOF

RELATED APPLICATIONS

This application claims priority to Taiwan Application Serial Number 112121259, filed Jun. 7, 2023, which is herein incorporated by reference.

BACKGROUND

Technical Field

The present disclosure relates to a communication technology field. More particularly, the present disclosure relates to a radio frequency transceiver adjusting method and an adjusting method system thereof.

Description of Related Art

With the increased demand for 5th generation mobile communication system (5G), related industries have proposed Open Radio Access Network (O-RAN), which is used to improve the flexibility of 5G architecture and provide intelligent management. Regarding the issue of improving the sensitivity of Remote Radio Unit (RRU) applied to O-RAN in the initial development stage, most of the prior art solutions are to optimize the matching circuit of the RRU, but this is cumbersome and time-consuming, causing related industries to spend additional development costs on manpower.

On the other hand, 3rd Generation Partnership Project (3GPP) specification not only test the performance of the RRU, but also test whether the sensitivity of the RRU for receiving signals conforms to the 3GPP specification under the intermodulation interference. Therefore, only optimizing the matching circuit cannot eliminate the interference caused by multi-signal interaction, so that the sensitivity of the RRU still cannot conform to the requirements of the 3GPP specification. It can be seen that there is currently a lack of an adjusting method and an adjusting system on the market that can comprehensively improve the performance of the RRU. Therefore, relevant industries are seeking solutions to address this issue.

SUMMARY

According to one aspect of the present disclosure, a radio frequency transceiver adjusting method includes performing a circuit matching step, a filter setting step and a configuration adjusting step. The circuit matching step includes configuring a controller to execute a circuit matching software module to perform a first transmission test on a radio frequency transceiver to generate a plurality of circuit test results, select a target simulated circuit from a plurality of reference simulated circuits, and match the target simulated circuit to the radio frequency transceiver. The target simulated circuit corresponds to a minimum value of the plurality of circuit test results. The filter setting step includes configuring the controller to execute a filter setting software module to set a filter parameter group, convert the filter parameter group into an initial configuration data, and import the initial configuration data to the radio frequency transceiver. The configuration adjusting step includes configuring the controller to execute a configuration adjusting software module to perform a second transmission test on the radio frequency transceiver to generate a plurality of parameter test results, select a target parameter from a plurality of reference parameters, and adjust the initial configuration data according to the target parameter. The target parameter corresponds to a minimum value of the plurality of parameter test results.

According to another aspect of the present disclosure, a radio frequency transceiver adjusting system includes a radio frequency transceiver, a memory and a controller. The memory stores a circuit matching software module, a filter setting software module and a configuration adjusting software module. The controller is connected to the memory and the radio frequency transceiver, and configured to implement a radio frequency transceiver adjusting method including performing a circuit matching step, a filter setting step and a configuration adjusting step. The circuit matching step includes configuring the controller to execute the circuit matching software module to perform a first transmission test on the radio frequency transceiver to generate a plurality of circuit test results, select a target simulated circuit from a plurality of reference simulated circuits, and match the target simulated circuit to the radio frequency transceiver. The target simulated circuit corresponds to a minimum value of the plurality of circuit test results. The filter setting step includes configuring the controller to execute the filter setting software module to set a filter parameter group, convert the filter parameter group into an initial configuration data, and import the initial configuration data to the radio frequency transceiver. The configuration adjusting step includes configuring the controller to execute the configuration adjusting software module to perform a second transmission test on the radio frequency transceiver to generate a plurality of parameter test results, select a target parameter from a plurality of reference parameters, and adjust the initial configuration data according to the target parameter. The target parameter corresponds to a minimum value of the plurality of parameter test results.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below.

However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected" to another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
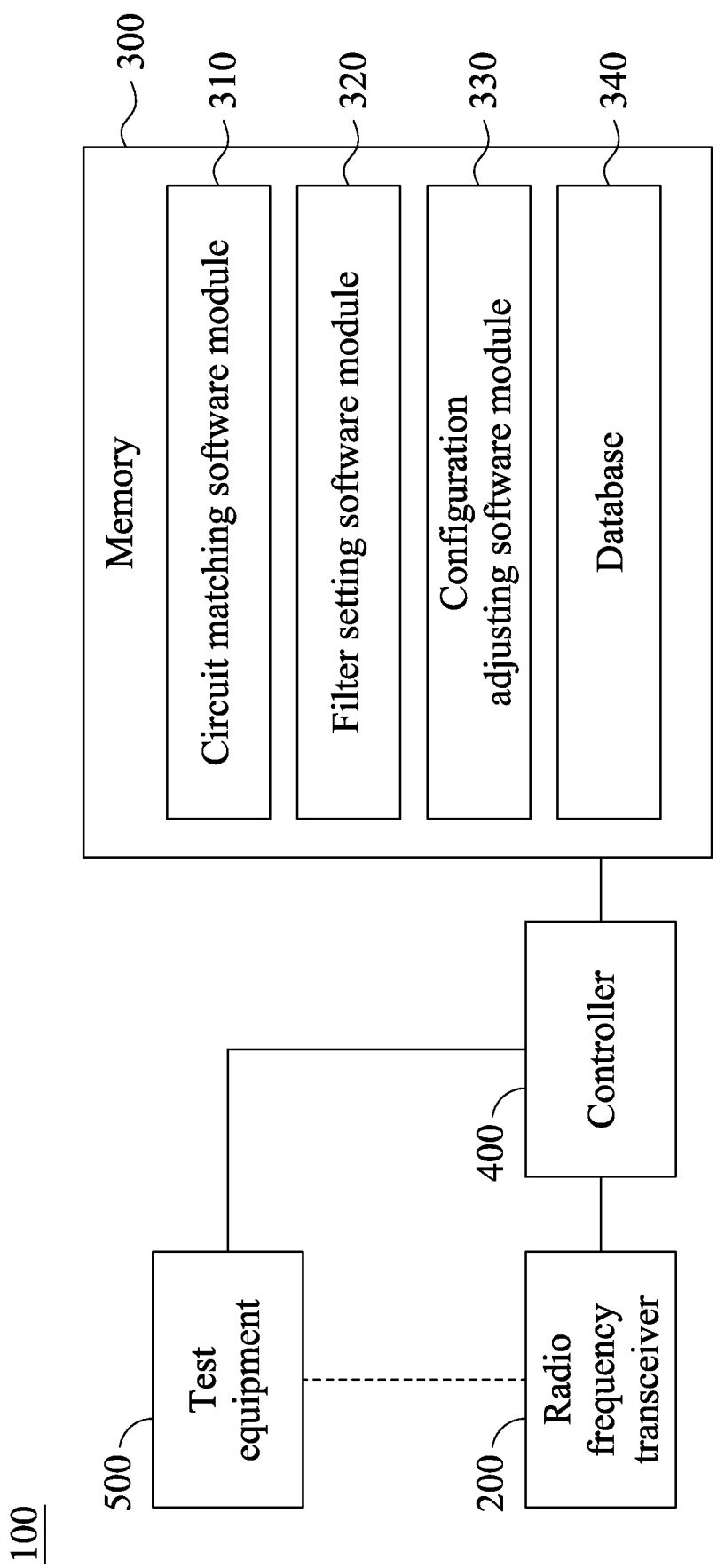
FIG. 1 shows a block diagram of a radio frequency transceiver adjusting system according to a first embodiment of the present disclosure.

Please refer to FIG. 1. FIG. 1 shows a block diagram of a radio frequency transceiver adjusting system 100 according to a first embodiment of the present disclosure. In FIG. 1, the radio frequency transceiver adjusting system 100 includes a radio frequency transceiver 200, a memory 300, a controller 400 and a test equipment 500.

The radio frequency transceiver 200 can be, but not limited to a Remote Radio Unit (RRU) applied to an Open Radio Access Network (O-RAN) or other communication devices that can operate in 2.4G/5G frequency band.

The memory 300 is a machine-readable medium, which can be, but not limited to a Random Access Memory (RAM), a Read-Only Memory (ROM), a flash memory, a hard disk drive or a combination of the foregoing devices, and stores a circuit matching software module 310, a filter setting software module 320 and a configuration adjusting software module 330 and a database 340. The circuit matching software module 310 and the configuration adjusting software module 330 are respectively configured to perform a first transmission test and a second transmission test on the radio frequency transceiver 200 for receiving radio frequency signals. The filter setting software module 320 is configured to set parameters of a digital filter for a Radio Frequency Integrated Circuit (RFIC) and a Baseband Integrated Circuit (BBIC) inside the radio frequency transceiver 200. Each of the aforementioned software modules can be written in any combination of one or more programming languages, which can include, but not limited to object-oriented programming languages (such as Java, C++, C#), conventional procedural programming languages (such as C programming language, Visual Basic), dynamic programming language (such as Python), or other programming languages. The database 340 can store a preset filter parameter group, a plurality of reference simulated circuits and a plurality of reference parameters. The preset filter parameter group can be used as an initial parameter configuration of a digital filter. The reference simulated circuits and the reference parameters can be used as the references for optimizing the radio frequency transceiver 200. The multiple pieces of data stored in the database 340 can be adjusted as needed based on user's requirements.

The controller 400 is signally connected to the memory 300 and the radio frequency transceiver 200, and configured to implement a radio frequency transceiver adjusting method including performing a circuit matching step, a filter setting step and a configuration adjusting step. The controller 400 adjusts the circuit configuration of the radio frequency transceiver 200 and the parameter setting of the digital filter through the aforementioned steps, thereby improving the sensitivity of the radio frequency transceiver 200 for receiving radio frequency signals. The controller 400 can be a Digital Signal Processor (DSP), a Micro Processing Unit (MPU), a Central Processing Unit (CPU), or other electronic processors. The controller 400 executes the circuit matching software module 310, the filter setting software module 320 and the configuration adjusting software module 330 to perform a parameter setting for the digital filter and the first, second and third transmission test on the radio frequency transceiver 200, and reads the data stored in the database 340 from the memory 300 to implement the radio frequency transceiver adjusting method proposed by the present disclosure.

The test equipment 500 is signally connected to the radio frequency transceiver 200 and the controller 400, and can be a wireless test instrument (such as Keysight E6680A) or other RF signal detection devices. The radio frequency transceiver 200 can receive a radio frequency signal from an external device. The test equipment 500 extracts the radio frequency signal from the radio frequency transceiver 200, performs multiplex testing on the radio frequency transceiver 200 according to the radio frequency signal to generate a plurality of test results and transmit the test results to controller 400. Therefore, the controller 400 can select a target simulated circuit and a target parameter from the database 340 according to the test results, and implement and adjust the circuit configuration of the radio frequency transceiver 200 and the parameter setting of the digital filter, thereby improving the performance of the radio frequency transceiver 200 effectively and reducing manual test time. In other embodiments, the controller and the memory of the present disclosure can be internal components of a smart device and/or a computer device. The controller is signally connected to a cloud server, and the cloud server reads each of the aforementioned software modules and the database. The steps in the radio frequency transceiver adjusting method of the present disclosure are described in more detail with the drawings below.

Figure 2:
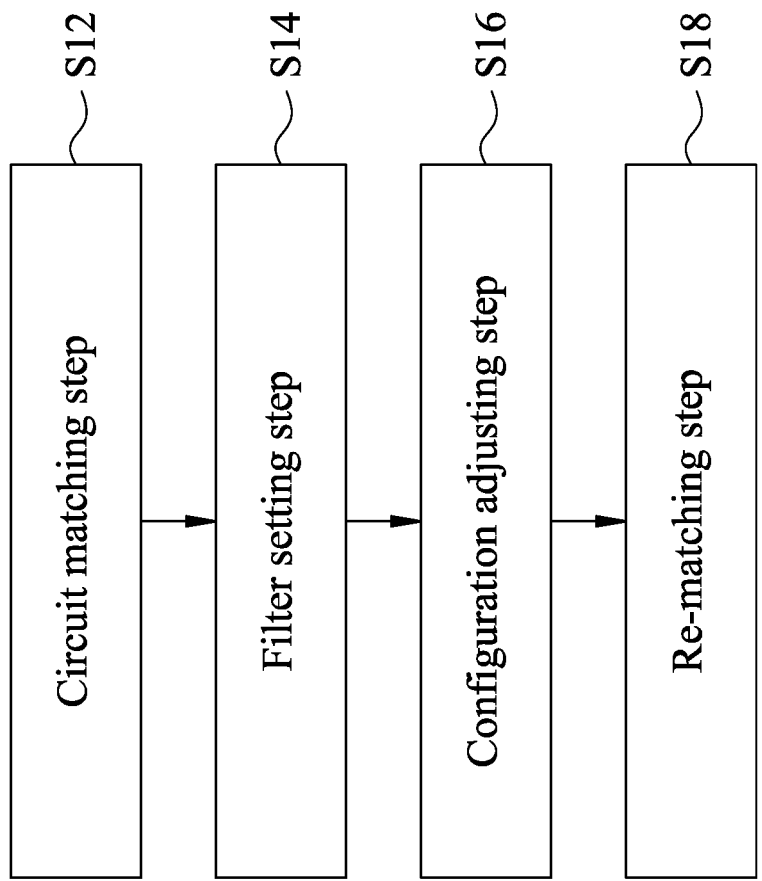
FIG. 2 shows a flow chart of a radio frequency transceiver adjusting method according to a second embodiment of the present disclosure.

Please refer to FIGS. 1 and 2. FIG. 2 shows a flow chart of a radio frequency transceiver adjusting method 10 according to a second embodiment of the present disclosure. In FIGS. 1 and 2, the radio frequency transceiver adjusting method 10 includes performing a circuit matching step S12, a filter setting step S14, a configuration adjusting step S16 and a re-matching step S18, and can be applied to radio frequency transceiver adjusting system 100. The radio frequency transceiver adjusting method 10 uses the controller 400 to sequentially execute the circuit matching step S12, the filter setting step S14, the configuration adjusting step S16 and the re-matching step S18 to optimize the circuit configuration of the radio frequency transceiver 200 and the parameter setting of the digital filter setting, so that the sensitivity of the radio frequency transceiver 200 for receiving radio frequency signals is improved.

The circuit matching step S12 includes configuring the controller 400 to execute the circuit matching software module 310 to perform the first transmission test on the radio frequency transceiver 200 to generate a plurality of circuit test results, select a target simulated circuit from the reference simulated circuits stored in the database 340 of the memory 300, and match the target simulated circuit to the radio frequency transceiver 200. The target simulated circuit corresponds to a minimum value of the circuit test results.

The filter setting step S14 includes configuring the controller 400 to execute the filter setting software module 320 to set a filter parameter group according to the preset filter parameter group stored in the database 340, convert the filter parameter group into an initial configuration data, and import the initial configuration data to the radio frequency transceiver 200.

The configuration adjusting step S16 includes configuring the controller 400 to execute the configuration adjusting software module 330 to perform the second transmission test on the radio frequency transceiver 200 to generate a plurality of parameter test results, select a target parameter from the reference parameters stored in the database 340, and adjust the initial configuration data according to the target parameter. The target parameter corresponds to a minimum value of the plurality of parameter test results.

The re-matching step S18 includes configuring the controller 400 to execute the circuit matching software module 310 to perform the third transmission test on the radio frequency transceiver 200 to generate another plurality of circuit test results, select one of the reference simulated circuits, and replace the target simulated circuit with the one of the reference simulated circuits. The one of the reference simulated circuits corresponds to a minimum value of the another plurality of circuit test results.

Thus, the radio frequency transceiver adjusting method 10 of the present disclosure can use the controller 400 to perform the first and second transmission tests on the radio frequency transceiver 200, and select the target simulated circuit and target parameter corresponding to the test result having the minimum value during the first and second transmission tests. Therefore, the present disclosure optimizes the matching circuit by implementing the target simulated circuit into the circuit configuration of the radio frequency transceiver 200, and sets an optimal filter parameter by adjusting/modifying the initial configuration data of the digital filter to the target parameter, so that the radio frequency transceiver 200 can use the digital filter to filter/eliminate the signal interference caused by intermodulation interference. In addition, after the optimal filter parameter are set, the controller 400 performs the third transmission test on the radio frequency transceiver 200, and perform a secondary fine-tuning and optimization work again on the circuit configuration of the radio frequency transceiver 200 to configure the best matching circuit, so that the radio frequency transceiver 200 can be comprehensively optimized.

Figure 3:
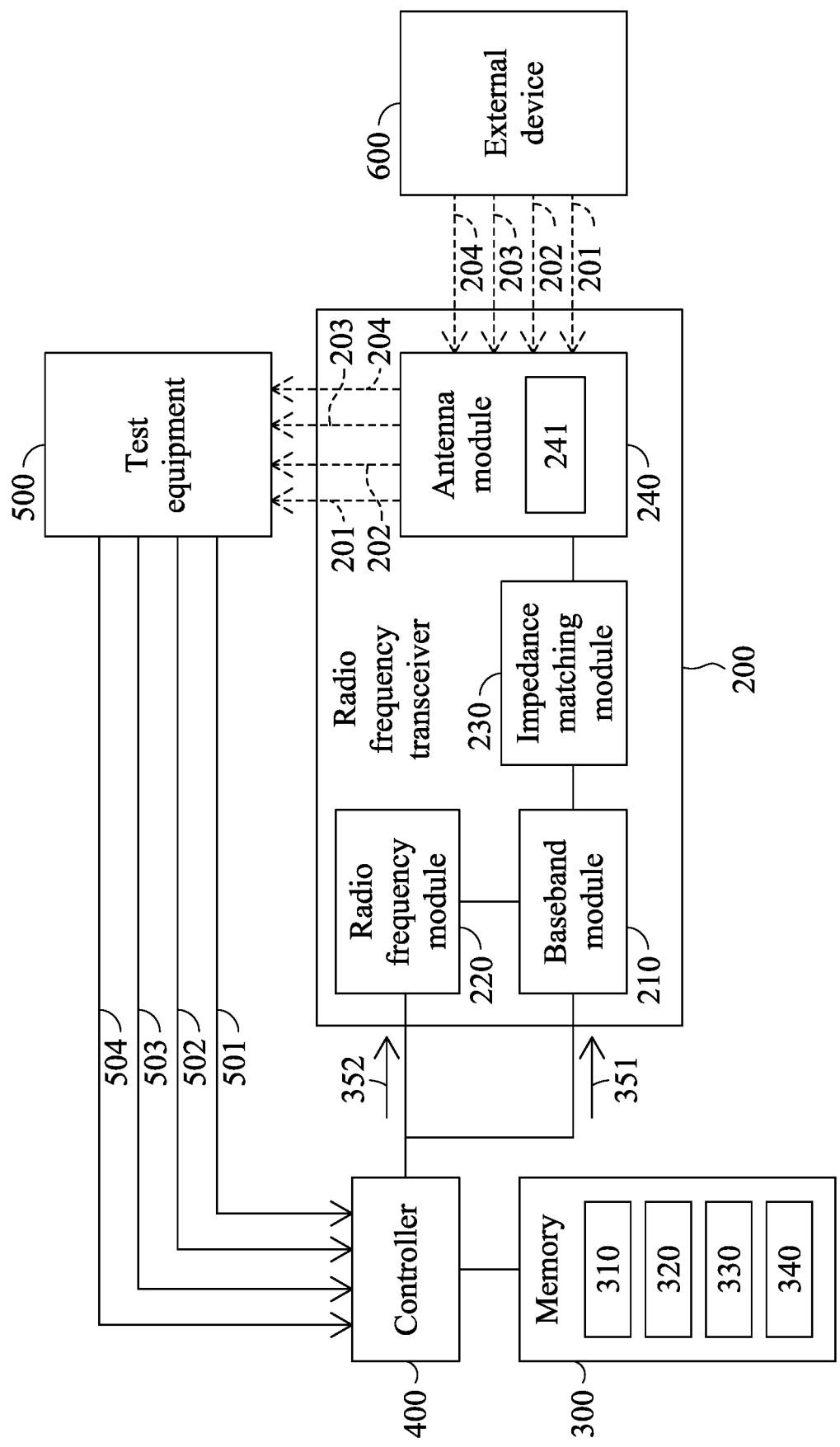
FIG. 3 shows a schematic view of a test environment showing the radio frequency transceiver adjusting method in a first example of the second embodiment of FIG. 2.
Figure 4:
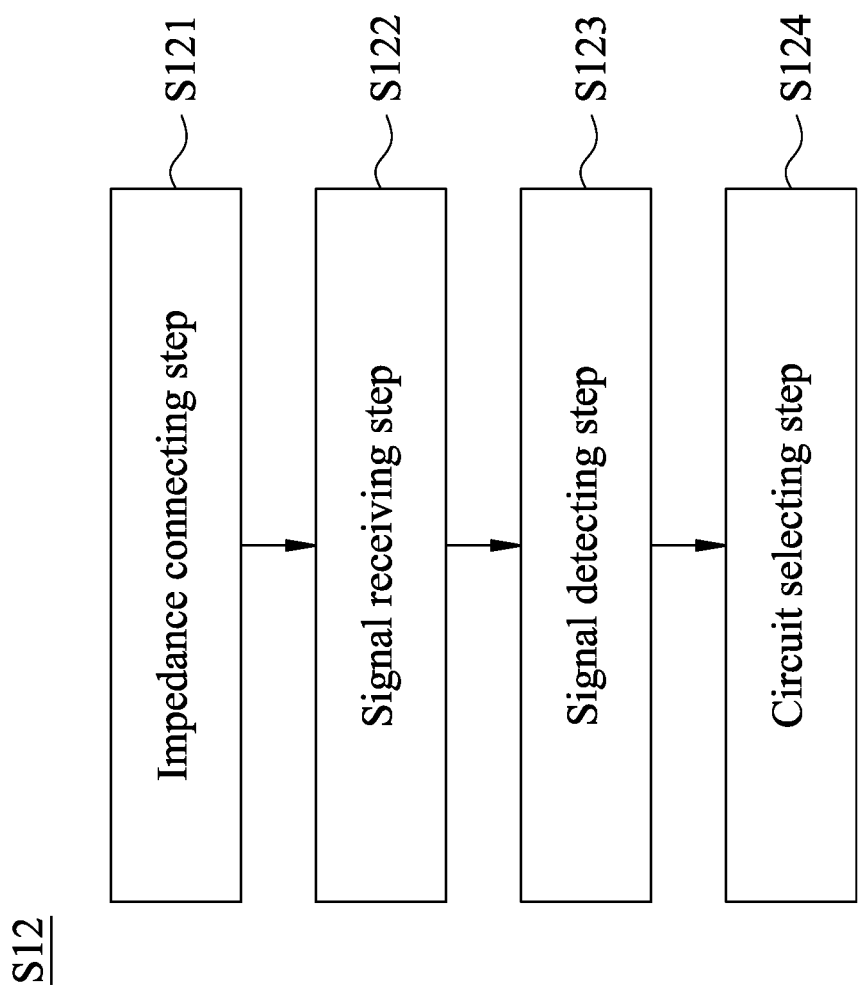
FIG. 4 shows a flow chart of a circuit matching step of the radio frequency transceiver adjusting method of FIG. 2.
Figure 5:
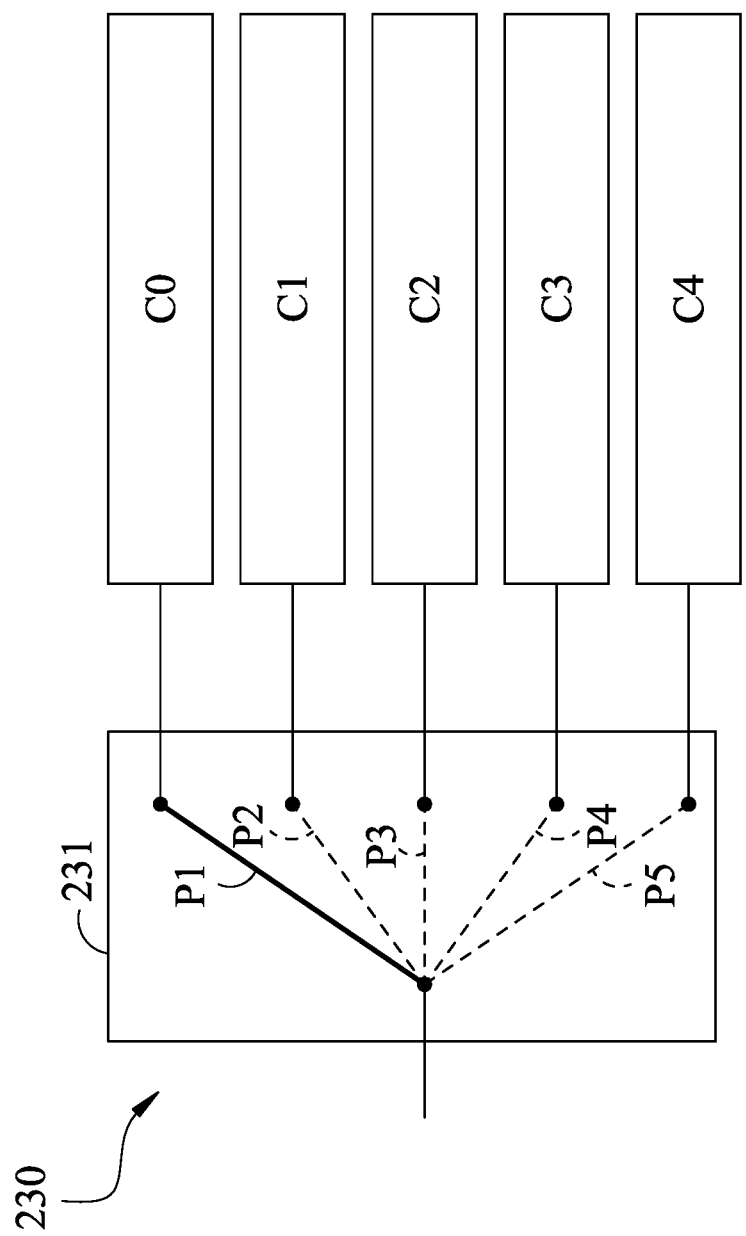
FIG. 5 shows a schematic view of an impedance matching module of a radio frequency transceiver of FIG. 3.

Please refer to FIGS. 1, 2, 3, 4 and 5. FIG. 3 shows a schematic view of a test environment showing the radio frequency transceiver adjusting method 10 in a first example of the second embodiment of FIG. 2. FIG. 4 shows a flow chart of the circuit matching step S12 of the radio frequency transceiver adjusting method 10 of FIG. 2. FIG. 5 shows a schematic view of an impedance matching module 230 of the radio frequency transceiver 200 of FIG. 3. In FIGS. 1, 2, 3, 4 and 5, the radio frequency transceiver 200 can include a baseband module 210, a radio frequency module 220, the impedance matching module 230 and an antenna module 240. Both the baseband module 210 and the radio frequency module 220 electrically connected to each other are signally connected to the controller 400. The antenna module 240 can receive a plurality of radio frequency signals from an external device 600, and the external device 600 can be, but not limited to a wireless radio frequency device or other electronic devices that can emit the radio frequency signals. In addition, the antenna module 240 can include a radio frequency test connector 241. The test equipment 500 is signally connected to the radio frequency test connector 241, and extracts the radio frequency signals from the radio frequency test connector 241 for testing and analyzing the performance of receiving signals of the radio frequency transceiver 200.

The circuit matching step S12 can further include performing an impedance connecting step S121, a signal receiving step S122, a signal detecting step S123 and a circuit selecting step S124. The impedance connecting step S121 is performed to connect the impedance matching module 230 between the antenna module 240 and the radio frequency module 220. The impedance matching module 230 includes an antenna switch 231, which can be a single pole five throw (SP5T) switch and includes a plurality of paths P1, P2, P3, P4, P5. The paths P1, P2, P3, P4, P5 are respectively connected to a preset matching circuit C0 and a plurality of reference simulated circuits C1, C2, C3, C4. In other embodiments, the antenna switch can be, but not limited to one or more multi-throw switches (such as SP10T). The number of the paths in the antenna switch is determined based on user's requirements and the number of the reference simulated circuits in the database.

The signal receiving step S122 is performed to configure the controller 400 to selectively switch the paths P1, P2, P3, P4, P5 of the antenna switch 231 of the impedance matching module 230 to respectively connect the preset matching circuit C0 and the reference simulated circuits C1, C2, C3, C4 during the first transmission test, and configure the antenna module 240 to respectively receive a plurality of radio frequency signals 201 corresponding to the preset matching circuit C0 and the reference simulated circuits C1, C2, C3, C4.

The signal detecting step S123 is performed to configure the test equipment 500 to detect the radio frequency signals 201 to respectively generate a plurality of circuit test results 501 corresponding to the preset matching circuit C0 and the reference simulated circuits C1, C2, C3, C4.

The circuit selecting step S124 is performed to configure the controller 400 to select the minimum value of the circuit test results 501 and determine that one of the preset matching circuit C0 and the reference simulated circuits C1, C2, C3, C4 corresponding to the minimum value of the circuit test results 501 is the target simulated circuit.

In detail, the impedance matching module 230 itself is provided with the preset matching circuit C0, and an impedance value of the preset matching circuit C0 can be 0 ohm. In the circuit matching step S12, the reference simulated circuits C1, C2, C3, C4 stored in the database 340 have different impedance values. For example, the impedance values of the reference simulated circuits C1, C2, C3, C4 can respectively correspond to any coordinate point in four quadrants of a smith chart. The antenna module 240 receives the radio frequency signals 201 from the external device 600 based on different impedance values (i.e., the impedance values the preset matching circuit C0 and the reference simulated circuits C1, C2, C3, C4) between itself and the radio frequency module 220. The testing equipment 500 tests and analyzes the radio frequency signals 201 to generate the circuit test results 501, respectively. Each of the circuit test results 501 can be a signal strength value (dB) of the receiving sensitivity of the radio frequency transceiver 200. The controller 400 selects one of the preset matching circuit C0 and the reference simulated circuits C1, C2, C3, C4 having the minimum signal strength value as the target simulated circuit according to the circuit test results 501. Thus, the controller 400 matches the target simulated circuit to the radio frequency transceiver 200 (i.e., connecting the path corresponding to the target simulated circuit), so that the radio frequency transceiver 200 achieves impedance matching.

Figure 6:
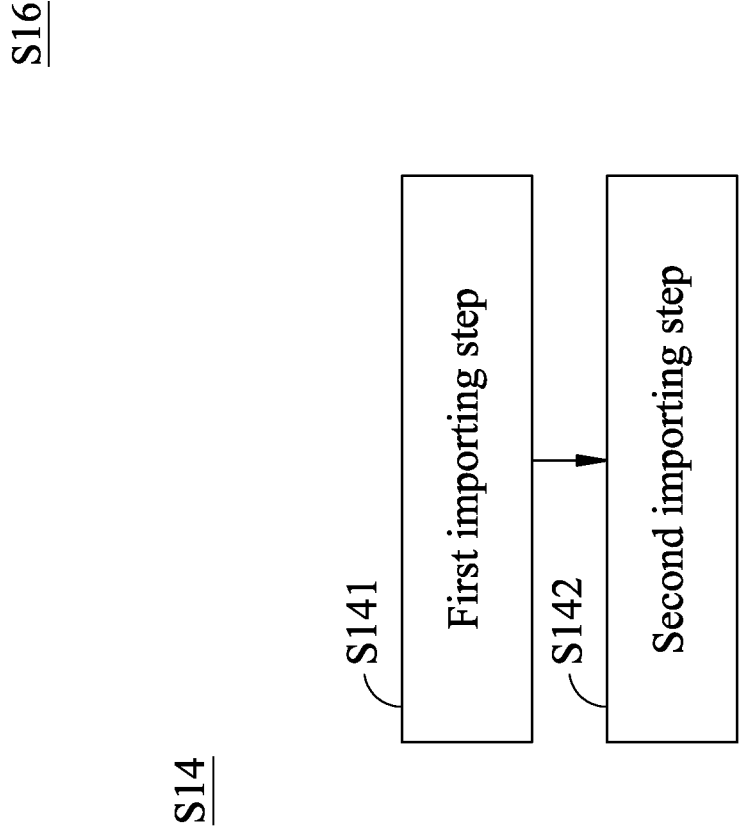
FIG. 6 shows a flow chart of a filter setting step of the radio frequency transceiver adjusting method of FIG. 2.

Please refer to FIGS. 1, 2, 3 and 6. FIG. 6 shows a flow chart of the filter setting step S14 of the radio frequency transceiver adjusting method 10 of FIG. 2. In the filter setting step S14, the database 340 can further store a filter design tool (such as a filter program/module using MATLAB as an interface). The controller 400 executes the filter setting software module 320 to import the preset filter parameter group into the filter design tool, converts the preset filter parameter group into a configuration file (Profile) and outputs the initial configuration data via the filter design tool, and stores the initial configuration data in the memory 300 for the controller 400 to read.

In detail, the preset filter parameter group can include a bandwidth value, a response type, a configuration type (i.e., design method), an order value, a frequency specification and a magnitude value used to configure the digital filter in the baseband module 210 and the radio frequency module 220. For example, the digital filter configured in the baseband module 210 and the radio frequency module 220 of the present disclosure can be, but not limited to a Finite Impulse Response (FIR) filter. Therefore, the bandwidth value can be set to 100 MHz, the response type can be set to Low-pass filter, and the configuration type can be set to Equiripple Filter. The frequency specification can include a sample rate, a passband frequency and a stopband frequency. The sample rate can be set to 245.76 MHZ, the passband frequency can be set to 49.14 MHZ, the stopband frequency can be set to 50 MHZ, and the magnitude value can be set to 1, but the present disclosure is not limited to the aforementioned filter parameters. In addition, the initial configuration data can include a first configuration data 351 and a second configuration data 352 based on different order values. A first-order value of the first configuration data 351 (e.g., 72) is greater than or equal to the second-order value of the second configuration data 352 (e.g., 200).

In FIG. 6, the filter setting step S14 can further include performing a first importing step S141 and a second importing step S142. The first importing step S141 is performed to configure the controller 400 to import the first configuration data 351 to the baseband module 210. The second importing step S142 is performed to configure the controller 400 to import the second configuration data 352 to the radio frequency module 220. Specifically, the baseband module 210 can be a baseband integrated circuit, and the radio frequency module 220 can be a radio frequency integrated circuit. Since the controller 400 configures two digital filters in the baseband module 210 and the radio frequency module 220 according to different proportions (i.e., the digital filters with different order values), it can avoid the problems of heat loss and loading concentration when the digital filter is only configured on a single chip module. Therefore, the present disclosure can not only increase the service life of the radio frequency transceiver 200, but also maintain the stability of the radio frequency transceiver 200 for transmitting and receiving radio frequency messages for a long time. In other embodiments, the first-order value can also be less than or equal to the second-order value, but the present disclosure is not limited to the ratio of the order values configured in the baseband module and the radio frequency module.

Figure 7:
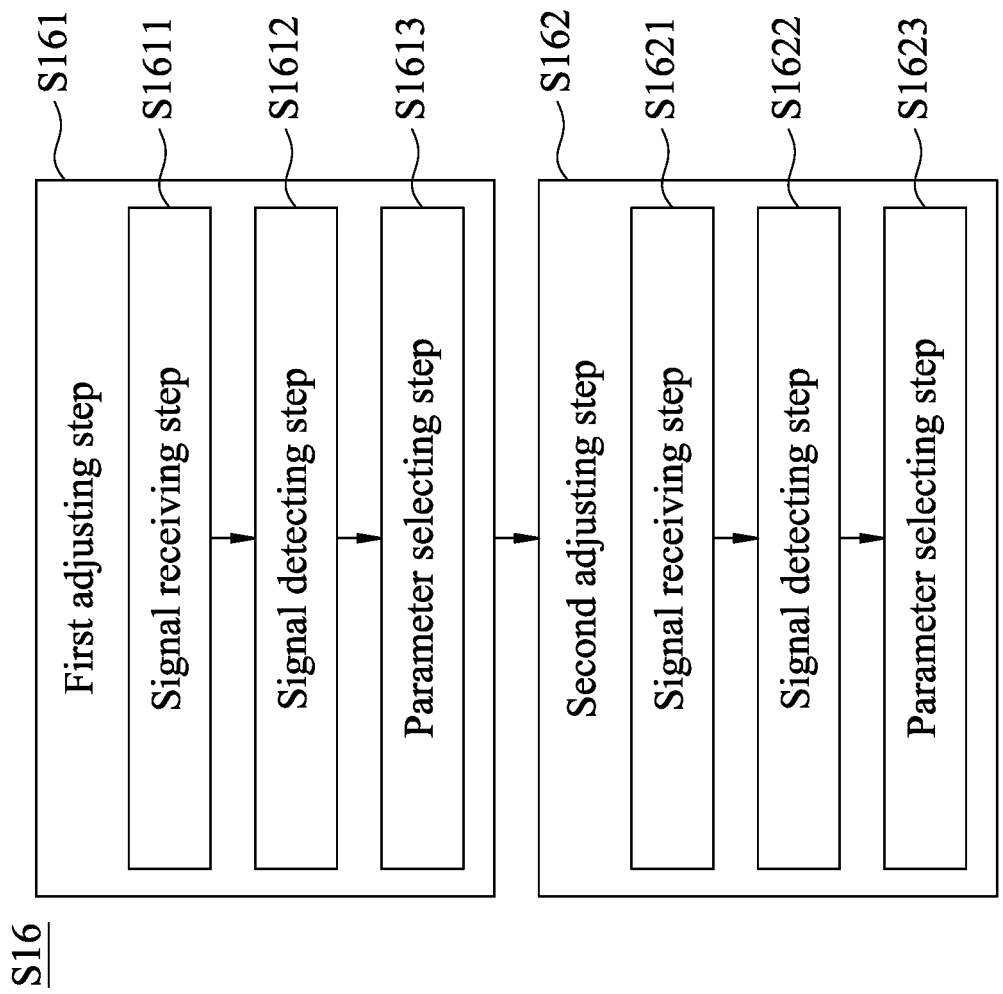
FIG. 7 shows a flow chart of a configuration adjusting step of the radio frequency transceiver adjusting method of FIG. 2.

Please refer to FIGS. 1, 2, 3 and 7. FIG. 7 shows a flow chart of the configuration adjusting step S16 of the radio frequency transceiver adjusting method 10 of FIG. 2. In FIGS. 1, 2, 3 and 7, the configuration adjusting step S16 can further include a first adjusting step S161 and a second adjusting step S162.

The first adjusting step S161 includes performing a signal receiving step S1611, a signal detecting step S1612 and a parameter selecting step S1613. The signal receiving step S1611 is performed to configure the antenna module 240 to receive a plurality of radio frequency signals 202 from the external device 600. The signal detecting step S1612 is performed to configure the test equipment 500 to extract the radio frequency signals 202 from radio frequency test connector 241 and detect the radio frequency signals 202 to respectively generate a plurality of parameter test results 502 corresponding to the reference parameters stored in the database 340. In detail, the aforementioned reference parameters can be an order value (such as 72, 200, 385 or 421), a configuration type of the digital filter (such as a Least Mean Square (LMS) filter or an equivalent ripple filter), or a combination of the aforementioned order values and the configuration types. When the antenna module 240 receives the radio frequency signals 202, the controller 400 imports different reference parameters into the baseband module 210. Therefore, the baseband module 210 can be equipped with the corresponding digital filters according to different reference parameters in the second transmission test. In other words, the test equipment 500 generates the parameter test results 502 according to the baseband module 210 equipped with the digital filter, and each of the parameter test results 502 can be a signal strength value (dB) of the receiving sensitivity of the radio frequency transceiver 200. The parameter selecting step S1613 is performed to configure the controller 400 to select the minimum value of the parameter test results 502, determine that one of the reference parameters corresponding to the minimum value of the parameter test results 502 is a target parameter, and adjust the first configuration data 351 previously imported to the baseband module 210 according to the target parameter.

The second adjusting step S162 includes a signal receiving step S1621, a signal detecting step S1622 and a parameter selecting step S1623. The signal receiving step S1621 is performed to configure the antenna module 240 to receive a plurality of radio frequency signals 203 from the external device 600. The signal detecting step S1622 is performed to configure the test equipment 500 to extract the radio frequency signals 203 from radio frequency test connector 241 and detect the radio frequency signals 203 to respectively generate a plurality of parameter test results 503 corresponding to the reference parameters stored in the database 340. In detail, the aforementioned reference parameters can be an order value (such as 24, 48 or 72), a configuration type of the digital filter (such as a LMS filter or an equivalent ripple filter), or a combination of the aforementioned order values and the configuration types. When the antenna module 240 receives the radio frequency signals 203, the controller 400 imports different reference parameters into the radio frequency module 220. Therefore, the radio frequency module 220 can be equipped with the corresponding digital filters according to different reference parameters in the second transmission test. In other words, the test equipment 500 generates the parameter test results 503 according to the radio frequency module 220 equipped with the digital filter, and each of the parameter test results 503 can be a signal strength value (dB) of the receiving sensitivity of the radio frequency transceiver 200. The parameter selecting step S1623 is performed to configure the controller 400 to select the minimum value of the parameter test results 503, determine that one of the reference parameters corresponding to the minimum value of the parameter test results 503 is a target parameter, and adjust the second configuration data 352 previously imported to the radio frequency module 220 according to the target parameter.

After the second transmission test is completed, the controller 400 selects the reference parameter having the minimum signal strength value for the receiving sensitivity according to the parameter test results 502 as a target parameter, and selects the reference parameter having the minimum signal strength value for the receiving sensitivity according to the parameter test results 503 as another target parameter. Thus, the controller 400 can respectively adjust/modify the filter parameters (i.e., the first configuration data 351 and the second configuration data 352) inside the baseband module 210 and the radio frequency module 220 through the aforementioned two target parameters. Therefore, after the matching circuit is optimized, the controller 400 sets the optimal filter parameters for the baseband module 210 and the radio frequency module 220 according to the aforementioned two target parameters, so that the radio frequency transceiver 200 can use the digital filter to filter/eliminate the signal interference caused by intermodulation interference.

In addition, the re-matching step S18 is similar to the circuit matching step S12, and can further include the same steps as the signal receiving step S122, the signal detecting step S123 and the circuit selecting step S124.

In FIG. 3, a signal receiving step of the re-matching step S18 is performed to configure the controller 400 to execute the circuit matching software module 310 again, selectively switch the paths P1, P2, P3, P4, P5 of the antenna switch 231 of the impedance matching module 230 to respectively connect the preset matching circuit C0 and the reference simulated circuits C1, C2, C3, C4 during the first transmission test, and configure the antenna module 240 to respectively receive a plurality of radio frequency signals 204 corresponding to the preset matching circuit C0 and the reference simulated circuits C1, C2, C3, C4.

A signal detecting step of the re-matching step S18 is performed to configure the test equipment 500 to detect the radio frequency signals 204 to respectively generate a plurality of circuit test results 504 corresponding to the preset matching circuit C0 and the reference simulated circuits C1, C2, C3, C4.

A circuit selecting step of the re-matching step S18 is performed to configure the controller 400 to select the minimum value of the circuit test results 504 and determine that one of the preset matching circuit C0 and the reference simulated circuits C1, C2, C3, C4 corresponding to the minimum value of the circuit test results 504 is another target simulated circuit. Thus, the controller 400 can replace the target simulated circuit selected in the first transmission test with the another target simulated circuit selected in the third transmission test so as to configure the best matching circuit for the radio frequency transceiver 200, so that the radio frequency transceiver 200 can be comprehensively optimized.

Figure 8:
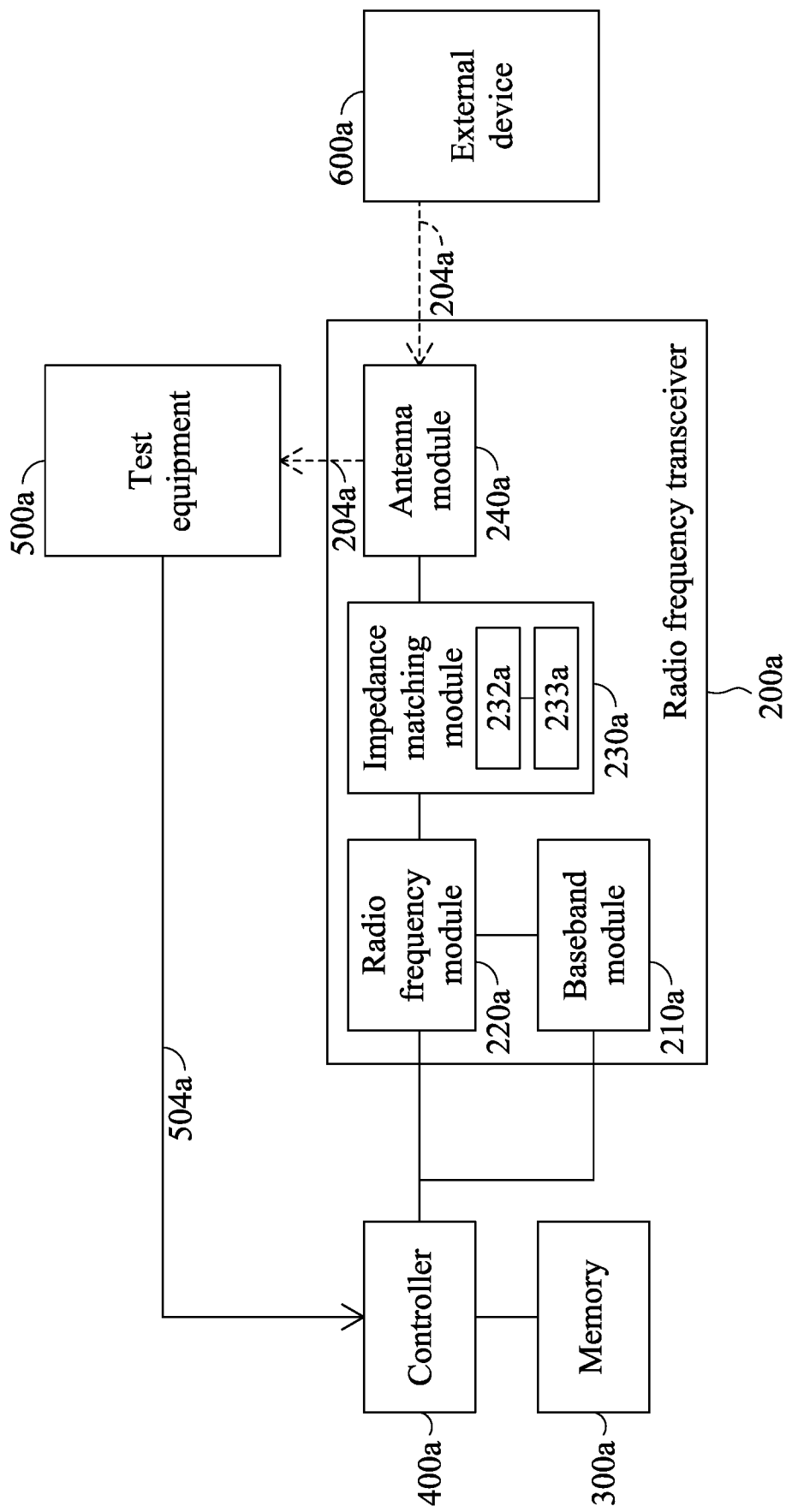
FIG. 8 shows a schematic view of a test environment showing a radio frequency transceiver adjusting method in a second example of the second embodiment.

Please refer to FIG. 8. FIG. 8 shows a schematic view of a test environment showing a radio frequency transceiver adjusting method in a second example of the second embodiment. The re-matching step of the second example includes configuring a controller 400a to re-execute a circuit matching software module stored in a memory 300a to perform a third transmission test on a radio frequency transceiver 200a. The radio frequency transceiver 200a can include a baseband module 210a, a radio frequency module 220a, an impedance matching module 230a and an antenna module 240a. The baseband module 210a, the radio frequency module 220a and the antenna module 240a are the same as the corresponding components in the first example, and not described again herein.

After a first transmission test of the second example is completed (i.e., the circuit matching step is completed), the controller 400a has selected a target simulated circuit as a first matching circuit 232a, and configured the first matching circuit 232a in the impedance matching module 230a.

In the third transmission test of the second example (i.e., in the re-matching step of the second example), a test equipment 500a detects a plurality of radio frequency signals 204a received by the antenna module 240a from an external device 600a to generate a plurality of circuit test results 504a. The controller 400a selects another target simulated circuit as a second matching circuit 233a from the circuit test results 504a, and the second matching circuit 233a corresponds to the minimum value of the circuit test results 504a. The controller 400a matches the second matching circuit 233a to the radio frequency transceiver 200a, that is, the second matching circuit 233a is electrically connected to the first matching circuit 232a. Thus, the radio frequency transceiver 200a can be optimized via a secondary fine-tuning and optimization work to configure the best matching circuit.

In view of the above, the present disclosure has the following advantages. First, improving the performance of the radio frequency transceiver for receiving radio frequency signals by configuring the best matching circuit. Second, by configuring the optimal filter parameters, the radio frequency transceiver can use the digital filters to filter/eliminate signal interference caused by intermodulation interference. Third, by configuring two digital filters in the baseband module and the radio frequency module according to different order values, it can avoid the problems of heat loss and loading concentration so as to increase the service life of the radio frequency transceiver and maintain the stability of the radio frequency transceiver for transmitting and receiving radio frequency messages.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A radio frequency transceiver adjusting method, comprising:

performing a circuit matching step comprising configuring a controller to execute a circuit matching software module to perform a first transmission test on a radio frequency transceiver to generate a plurality of circuit test results, select a target simulated circuit from a plurality of reference simulated circuits, and match the target simulated circuit to the radio frequency transceiver, wherein the target simulated circuit corresponds to a minimum value of the plurality of circuit test results;

performing a filter setting step comprising configuring the controller to execute a filter setting software module to set a filter parameter group, convert the filter parameter group into an initial configuration data, and import the initial configuration data to the radio frequency transceiver; and performing a configuration adjusting step comprising configuring the controller to execute a configuration adjusting software module to perform a second transmission test on the radio frequency transceiver to generate a plurality of parameter test results, select a target parameter from a plurality of reference parameters, and adjust the initial configuration data according to the target parameter, wherein the target parameter corresponds to a minimum value of the plurality of parameter test results.

2. The radio frequency transceiver adjusting method of claim 1, further comprising:

performing a re-matching step comprising configuring the controller to execute the circuit matching software module to perform a third transmission test on the radio frequency transceiver to generate another plurality of circuit test results, select one of the plurality of reference simulated circuits, and replace the target simulated circuit with the one of the plurality of reference simulated circuits, wherein the one of the plurality of reference simulated circuits corresponds to a minimum value of the another plurality of circuit test results.

3. The radio frequency transceiver adjusting method of claim 1, further comprising:

performing a re-matching step comprising configuring the controller to execute the circuit matching software module to perform a third transmission test on the radio frequency transceiver to generate another plurality of circuit test results, select another target simulated circuit from the plurality of reference simulated circuits, and match the another target simulated circuit to the radio frequency transceiver, wherein the another target simulated circuit corresponds to a minimum value of the another plurality of circuit test results.

4. The radio frequency transceiver adjusting method of claim 1, wherein the radio frequency transceiver comprises an antenna module and a radio frequency module, and the circuit matching step further comprises:

performing an impedance connecting step to connect an impedance matching module between the antenna module and the radio frequency module;

performing a signal receiving step to configure the controller to selectively switch a plurality of paths of the impedance matching module to respectively connect the plurality of reference simulated circuits during the first transmission test, and configure the antenna module to respectively receive a plurality of radio frequency signals corresponding to the plurality of reference simulated circuits;

performing a signal detecting step to configure a test equipment to detect the plurality of radio frequency signals to respectively generate the plurality of circuit test results corresponding to the plurality of reference simulated circuits; and performing a circuit selecting step to configure the controller to select the minimum value of the plurality of circuit test results and determine that one of the plurality of reference simulated circuits corresponding to the minimum value of the plurality of circuit test results is the target simulated circuit.

5. The radio frequency transceiver adjusting method of claim 1, wherein the filter parameter group comprises a bandwidth value, a response type, a configuration type, an order value, a frequency specification, and a magnitude value.

6. The radio frequency transceiver adjusting method of claim 1, wherein the radio frequency transceiver comprises a baseband module and a radio frequency module, the initial configuration data comprises a first configuration data and a second configuration data, and the filter setting step further comprises:

performing a first importing step to configure the controller to import the first configuration data to the baseband module; and performing a second importing step to configure the controller to import the second configuration data to the radio frequency module;

wherein a first-order value of the first configuration data is greater than or equal to a second-order value of the second configuration data.

7. The radio frequency transceiver adjusting method of claim 6, wherein the radio frequency transceiver further comprises an antenna module, and the configuration adjusting step further comprises:

performing a first adjusting step, comprising:
performing a signal receiving step to configure the antenna module to receive a plurality of radio frequency signals;
performing a signal detecting step to configure a test equipment to detect the plurality of radio frequency signals to respectively generate the plurality of parameter test results corresponding to the plurality of reference parameters; and
performing a parameter selecting step to configure the controller to select the minimum value of the plurality of parameter test results, determine that one of the plurality of reference parameters corresponding to the minimum value of the plurality of parameter test results is the target parameter, and adjust the first configuration data according to the target parameter.

8. The radio frequency transceiver adjusting method of claim 6, wherein the radio frequency transceiver further comprises an antenna module, and the configuration adjusting step further comprises:

performing a second adjusting step, comprising:
performing a signal receiving step to configure the antenna module to receive a plurality of radio frequency signals;
performing a signal detecting step to configure a test equipment to detect the plurality of radio frequency signals to respectively generate the plurality of parameter test results corresponding to the plurality of reference parameters; and
performing a parameter selecting step to configure the controller to select the minimum value of the plurality of parameter test results, determine that one of the plurality of reference parameters corresponding to the minimum value of the plurality of parameter test results is the target parameter, and adjust the second configuration data according to the target parameter.

9. The radio frequency transceiver adjusting method of claim 1, wherein each of the plurality of circuit test results and the plurality of parameter test results is a signal strength value corresponding to a receiving sensitivity.

10. A radio frequency transceiver adjusting system, comprising:
a radio frequency transceiver;

a memory storing a circuit matching software module, a filter setting software module and a configuration adjusting software module; and a controller connected to the memory and the radio frequency transceiver and configured to implement a radio frequency transceiver adjusting method comprising:

performing a circuit matching step comprising configuring the controller to execute the circuit matching software module to perform a first transmission test on the radio frequency transceiver to generate a plurality of circuit test results, select a target simulated circuit from a plurality of reference simulated circuits, and match the target simulated circuit to the radio frequency transceiver, wherein the target simulated circuit corresponds to a minimum value of the plurality of circuit test results;

performing a filter setting step comprising configuring the controller to execute the filter setting software module to set a filter parameter group, convert the filter parameter group into an initial configuration data, and import the initial configuration data to the radio frequency transceiver; and performing a configuration adjusting step comprising configuring the controller to execute the configuration adjusting software module to perform a second transmission test on the radio frequency transceiver to generate a plurality of parameter test results, select a target parameter from a plurality of reference parameters, and adjust the initial configuration data according to the target parameter, wherein the target parameter corresponds to a minimum value of the plurality of parameter test results.

11. The radio frequency transceiver adjusting system of claim 10, wherein the radio frequency transceiver adjusting method further comprises:

performing a re-matching step comprising configuring the controller to execute the circuit matching software module to perform a third transmission test on the radio frequency transceiver to generate another plurality of circuit test results, select one of the plurality of reference simulated circuits, and replace the target simulated circuit with the one of the plurality of reference simulated circuits, wherein the one of the plurality of reference simulated circuits corresponds to a minimum value of the another plurality of circuit test results.

12. The radio frequency transceiver adjusting system of claim 10, wherein the radio frequency transceiver adjusting method further comprises:

performing a re-matching step comprising configuring the controller to execute the circuit matching software module to perform a third transmission test on the radio frequency transceiver to generate another plurality of circuit test results, select another target simulated circuit from the plurality of reference simulated circuits, and match the another target simulated circuit to the radio frequency transceiver, wherein the another target simulated circuit corresponds to a minimum value of the another plurality of circuit test results.

13. The radio frequency transceiver adjusting system of claim 10, further comprising:

a test equipment connected to the radio frequency transceiver and the controller;

wherein the radio frequency transceiver comprises:
an antenna module;
an impedance matching module connected to the antenna module and comprising a plurality of paths; and
a radio frequency module connected to the impedance matching module;

wherein the circuit matching step further comprises:
performing a signal receiving step to configure the controller to selectively switch the plurality of paths of the impedance matching module to respectively connect the plurality of reference simulated circuits during the first transmission test, and configure the antenna module to respectively receive a plurality of radio frequency signals corresponding to the plurality of reference simulated circuits;

performing a signal detecting step to configure the test equipment to detect the plurality of radio frequency signals to respectively generate the plurality of circuit test results corresponding to the plurality of reference simulated circuits; and performing a circuit selecting step to configure the controller to select the minimum value of the plurality of circuit test results and determine that one of the plurality of reference simulated circuits corresponding to the minimum value of the plurality of circuit test results is the target simulated circuit.

14. The radio frequency transceiver adjusting system of claim 10, wherein the filter parameter group comprises a bandwidth value, a response type, a configuration type, an order value, a frequency specification, and a magnitude value.

15. The radio frequency transceiver adjusting system of claim 10, wherein the radio frequency transceiver comprises:

a baseband module; and
a radio frequency module connected to the baseband module;

wherein the initial configuration data comprises a first configuration data and a second configuration data, and the filter setting step further comprises:

performing a first importing step to configure the controller to import the first configuration data to the baseband module; and performing a second importing step to configure the controller to import the second configuration data to the radio frequency module;

wherein a first-order value of the first configuration data is greater than or equal to a second-order value of the second configuration data.

16. The radio frequency transceiver adjusting system of claim 15, further comprising:

a test equipment connected to the radio frequency transceiver and the controller;

wherein the radio frequency transceiver further comprises an antenna module connected to the radio frequency module, and the configuration adjusting step further comprises:

performing a first adjusting step, comprising:
performing a signal receiving step to configure the antenna module to receive a plurality of radio frequency signals;

performing a signal detecting step to configure the test equipment to detect the plurality of radio frequency signals to respectively generate the plurality of parameter test results corresponding to the plurality of reference parameters; and performing a parameter selecting step to configure the controller to select the minimum value of the plurality of parameter test results, determine that one of the plurality of reference parameters corresponding to the minimum value of the plurality of parameter test results is the target parameter, and adjust the first configuration data according to the target parameter.

17. The radio frequency transceiver adjusting system of claim 15, further comprising:
   a test equipment connected to the radio frequency transceiver and the controller;
   wherein the radio frequency transceiver further comprises an antenna module connected to the radio frequency module, and the configuration adjusting step further comprises:
   performing a second adjusting step, comprising:
      performing a signal receiving step to configure the antenna module to receive a plurality of radio frequency signals;
      performing a signal detecting step to configure the test equipment to detect the plurality of radio frequency signals to respectively generate the plurality of parameter test results corresponding to the plurality of reference parameters; and
      performing a parameter selecting step to configure the controller to select the minimum value of the plurality of parameter test results, determine that one of the plurality of reference parameters corresponding to the minimum value of the plurality of parameter test results is the target parameter, and adjust the second configuration data according to the target parameter.

18. The radio frequency transceiver adjusting system of claim 10, wherein each of the plurality of circuit test results and the plurality of parameter test results is a signal strength value corresponding to a receiving sensitivity.

* * * * *